Figures 1, 2:
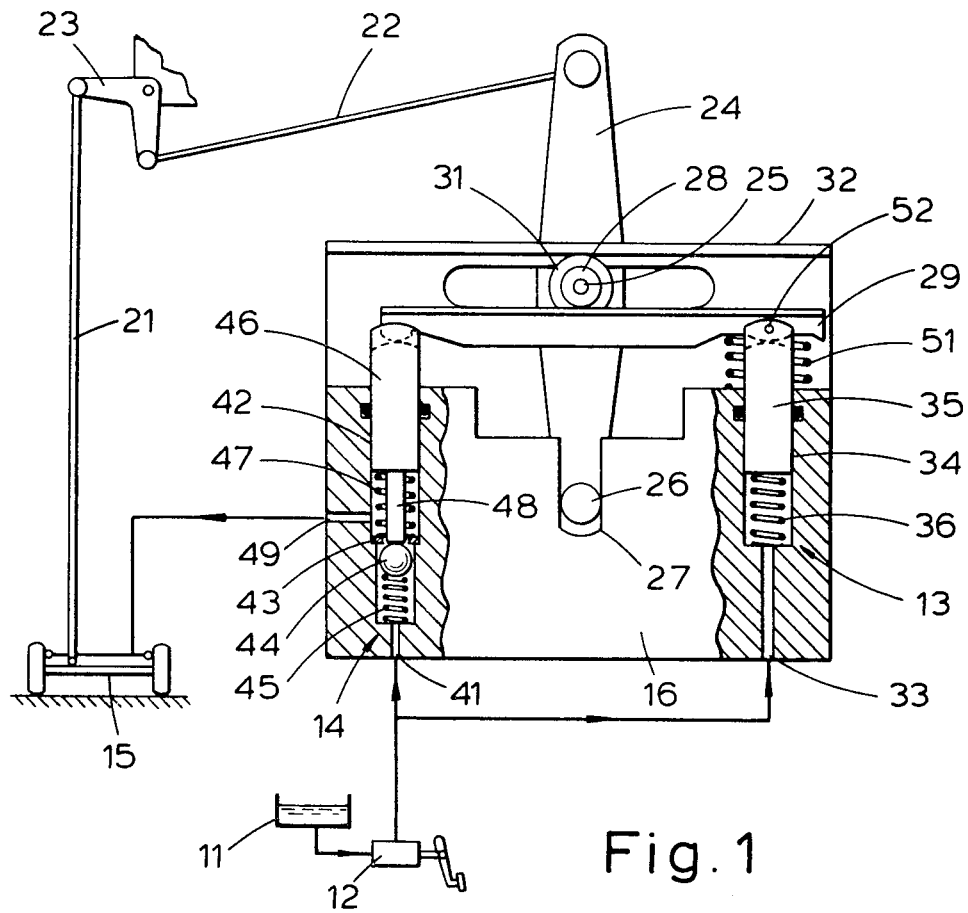

United States Patent [19]

Young

[11] 4,251,116

[45] Feb. 17, 1981

[54] FLUID BRAKING SYSTEMS

[75] Inventor: Alastair J. Young, Kenilworth, England

[73] Assignee: Automotive Products Limited, Leamington Spa, England

[21] Appl. No.: 42,556

[22] Filed: May 25, 1979

[30] Foreign Application Priority Data

May 31, 1978 [GB] United Kingdom ............... 25729/78

[51] Int. Cl.³ .............................................. B60T 8/22
[52] U.S. Cl. ................................................. 303/22 R
[58] Field of Search ........... 188/195; 303/22 A, 22 R, 303/23 A, 23 R

[56] References Cited

U.S. PATENT DOCUMENTS

| 2,490,641 | 12/1949 | DuRostu | 188/195 |
| 4,143,924 | 3/1979 | Coupland | 303/22 R |

Primary Examiner—Duane A. Reger
Attorney, Agent, or Firm—Kemon & Estabrook

[57] ABSTRACT

A pressure regulator for a vehicle braking system through which fluid under pressure is supplied to actuate wheel brakes and which includes means to limit brake pressure to a proportion of applied pressure dependent on a variable ratio lever system whose ratio depends on the load of the vehicle.

Above a given applied pressure, dependent on the ratio of the lever system, the rate of increase of brake pressure is reduced, dependent on the ratio of the lever system.

6 Claims, 2 Drawing Figures

FLUID BRAKING SYSTEMS

This invention relates to vehicle hydraulic braking systems, and more particularly to means for regulating the system braking pressure to a proportion of the system applied pressure in accordance with changes in the vehicle loading.

It is desirable, in a vehicle braking system, to vary the maximum braking force in accordance with the vehicle loading. This is especially desirable in goods vehicles, where the change in axle loads and in load distribution between axles can be considerable.

Hydraulic braking systems are known in which the braking pressure in one part of the system is limited to a pre-determined applied pressure. Other braking systems reduce the rate of increase of braking pressure, above a pre-determined applied pressure, to a fixed proportion of applied pressure.

The pre-determined applied pressure may be pre-set, but is more usually variable in accordance with changes in the vehicle load. Such changes are commonly sensed by a linkage responsive to the relative distance between sprung and unsprung parts of the vehicle.

It is the object of the present invention to provide a vehicle braking system pressure regulator which gives a desirable load dependent braking characteristic.

According to the invention there is provided a vehicle braking system pressure regulator through which fluid under pressure is supplied to actuate wheel brakes and which includes means to limit brake pressure to a proportion of applied pressure dependent on a variable ratio lever system whose ratio depends on the loading of the vehicle, characterised thereby that means are provided to vary fluid pressure controlled by the regulator such that above a given applied pressure, dependent on the ratio of the lever system, the rate of increase of brake pressure is dependent on the ratio of the lever system.

Preferably the regulator is arranged so that the given applied pressure is proportional to the instantaneous ratio of the lever system, and that the rate of increase of brake pressure above the given applied pressure is proportional to the instantaneous ratio of the lever system.

In one form of regulator according to this invention the variable ratio lever system comprises a pivoted beam whose fulcrum position is dependent on the loading of the vehicle and which controls a brake pressure limiting valve, the effect of brake pressure being arranged to act on one arm of the beam in opposition to the effect of applied pressure and of a pre-loaded spring arranged to act on the other arm of the beam.

Preferably the effect of applied pressure and the effect of brake pressure are arranged to act on the beam through applied piston means or the like and brake piston means or the like.

The phrase piston means or the like includes pistons, diaphragms and other movable members operable by fluid pressure. Hereinafter, for simplicity, reference will be made only to pistons or piston means.

Other features of the invention are included in the following description of a preferred embodiment shown, by way of example, on the accompanying drawing in which:

FIG. 1 is a diagrammatic representation of a load sensitive pressure regulator comprising one embodiment of the invention; and FIG. 2 is a graph of brake pressure against applied pressure for varying axle loads.

In the braking system shown in FIG. 1 a hydraulic fluid reservoir 11 is connected through a drivers brake valve 12, in the form of a conventional master cylinder, to a loading chamber 13, and through a pressure limiting valve 14 to the brakes of a vehicle axle 15. The chamber 13 and valve 14 form part of a frame 16 attached to the vehicle body which is resiliently supported on the axle 15 by any suitable means.

A vertical link 21, pivoted to the axle 15 is connected to a horizontal link 22 through a bell crank 23 mounted on the vehicle body. Link 22 is connected to one end of a vertical beam 24 which carries a pivot pin 25 near its centre. The other end of the beam 24 carries a roller 26 which engages a vertical slot 27 in the frame 16. The slot 27 restrains the beam 24 transversely whilst allowing it to rock about the roller 26.

The pivot pin 25 carries two rollers. One roller 28, of smaller diameter, acts as a fulcrum for a horizontal beam 29 and the other roller 31, of larger diameter, bears against a flange 32 on the frame 16.

The loading chamber 13 has an inlet port 33 opening into the blind end of an open plain bore 34 in which a loading plunger 35 is slidable. The plunger 35 is biassed into engagement with one end of the beam 29 by a light compression spring 36.

The limiting valve 14 has an inlet port 41 opening into the blind end of an open stepped bore 42 which has an annular seat 43 formed midway along its length. A ball 44 is urged into sealing engagement with the seat 43 by a light coiled compression spring 45 acting between the ball 44 and the blind end of the bore 42.

A plunger 46, slidable in the bore 42, is biassed against the other end of the beam 29 by a light compression spring 47. The plunger 46 has an axial extension 48 which can pass through the aperture in the seat 43 to lift the ball 44 against the action of spring 45. A brake port 49 is provided between the seat 43 and the inner face of the plunger 46 for connection to the brakes of the axle 15.

A pre-loaded coiled compression spring 51 acts between the frame 16 and one end of the horizontal beam 29 in assistance to the effort from plunger 35. Plungers 35 and 46 have the same effective area.

The horizontal beam 29 is located in a slot formed in each of the plungers 35, 46. A roll pin 52 through one of the plungers and the adjacent end of the beam 29 restrains the beam transversely.

In FIG. 1 the parts are shown in a vehicle laden condition. Pivot pin 25 is midway between the axes of the plungers 35, 46, the beam lever ratio "R"=1.

If the vehicle driver generates a pressure in the master cylinder 12, the full applied pressure is transmitted through the limiting valve 14 to the brakes of the axle 15. Since the areas of plungers 35, 46 are equal and their moment arms on the horizontal beam 29 are identical, the pre-load of the spring 51 ensures that the ball 44 remains unseated. On release, the brake pressure will exhaust through the limiting valve 14 to the reservoir 11.

If the vehicle load reduces, the axle 15 will move relatively away from the vehicle body and cause the vertical beam 24 to rotate clockwise about the roller 26, the effective pivot point of the horizontal beam will shift to a point between the mid position of the beam 29 and the axis of the plunger 35. Thus a beam lever ratio in favour of the limiting valve 14 will exist, "R"<1.

Operation of the master cylinder 12 will cause pressurized fluid to pass through the limiting valve 14 to the brakes of the axle 15 as previously described.

At low applied pressures the moment exerted by the pre-load of the spring 51 and the hydraulic force on the plunger 35 will oppose the moment exerted by the hydraulic force on the plunger 46, this relationship is typified by portion a-b of the characteristic shown in FIG. 2 where "R" is the beam lever ratio.

As the applied pressure increases the moment exerted on the beam by the plunger 46 will overcome that exerted by the force of the spring 51 and the plunger 35 and the horizontal beam 29 will rotate clockwise about the smaller roller 28.

The limiting valve plunger 46 will move outward in its bore 42 and allow the spring 45 to move the ball 44 against the seat 43, preventing the pressure in the brake of the axle 15 increasing further.

If the applied pressure increases still more the additional hydraulic force on the plunger 35 will cause the beam 29 to rotate anti-clockwise about the smaller roller 28, so depressing the plunger 46 and unseating the ball 44.

The pressure in the brakes of the axle 15 will increase until the clockwise moment on the beam 29 is restored and the ball 44 is allowed to reseat.

This oscillation of the beam 29 will continue so long as the applied pressure continues to rise, allowing the axle braking pressure to increase at a proportion of the applied braking pressure, this relationship is typified by portion b-c of the characteristic shown in FIG. 2.

Any reduction in applied pressure whilst the ball 44 is seated will tend to rotate the beam 29 clockwise, the plunger 46 will move outwards in the bore 42 and the axle brake pressure will reduce. If the applied pressure falls below brake pressure the unequal hydraulic force on the ball 44 will cause it to unseat and exhaust the pressure in the brakes of the axle 15.

At low applied pressures the force of the spring 51 will rotate the beam 29 anti-clockwise and the plunger 46 will move in the bore 42 to hold the ball 44 unseated.

The "knee" point "b", of the characteristic shown in FIG. 2 is determined by the position of the effective pivot point of the beam 29 and the pre-load of the spring 51. The rate of increase of axle brake pressure after the "knee" point has been reached reduces as the vehicle load reduces.

Although the foregoing embodiment relates solely to hydraulic braking systems it will be realised that the principle of operation can be extended to air braking systems.

I claim:

1. A pressure regulator for a vehicle braking system through which fluid under pressure is supplied to actuate wheel brakes and which includes means to limit brake pressure to a proportion of applied pressure dependent on the vehicle loading, said regulator comprising:

a housing;

first piston means located in the housing to be responsive to brake pressure;

second piston means located in the housing to be responsive to applied pressure;

a beam member acted on by said first and second piston means;

pre-loaded resilient means acting on said beam independently and conjointly with said second piston means;

a fulcrum member supported by said housing and providing a fulcrum for said beam member intermediate said first and second piston means, means being provided for the position of said fulcrum to be dependent on vehicle loading;

and valve means responsive to the angular position of said beam member to control fluid pressure in the regulator to control brake pressure.

2. A pressure regulator according to claim 1, wherein said fulcrum is on the opposite side of said beam to said first and second piston means.

3. A pressure regulator according to claim 1 or claim 2, wherein said valve means are operable through said first piston means.

4. A pressure regulator according to claim 1, wherein said first and second pistons have the same effective area.

5. A pressure regulator according to claim 1, wherein said resilient means are co-axial with said second piston means.

6. A pressure regulator according to claim 5, wherein said resilient means comprise a coiled compression spring.

* * * * *